(12) United States Patent
Jordan et al.

(10) Patent No.: US 12,206,991 B2
(45) Date of Patent: Jan. 21, 2025

(54) BODY LANGUAGE DETECTION AND MICROPHONE CONTROL

(71) Applicant: Universal City Studios LLC, Universal City, CA (US)

(72) Inventors: Robert Michael Jordan, Orlando, FL (US); Howard Mall, Winter Springs, FL (US)

(73) Assignee: Universal City Studios LLC, Universal City, CA (US)

( * ) Notice: Subject to any disclaimer, the term of this patent is extended or adjusted under 35 U.S.C. 154(b) by 195 days.

(21) Appl. No.: 17/711,923

(22) Filed: Apr. 1, 2022

(65) Prior Publication Data
US 2023/0319416 A1    Oct. 5, 2023

(51) Int. Cl.
| | |
|---|---|
| *H04N 5/232* | (2006.01) |
| *G06V 40/16* | (2022.01) |
| *G06V 40/20* | (2022.01) |
| *H04N 23/695* | (2023.01) |
| *H04R 1/08* | (2006.01) |
| *H04R 3/00* | (2006.01) |

(52) U.S. Cl.
CPC ......... *H04N 23/695* (2023.01); *G06V 40/176* (2022.01); *G06V 40/23* (2022.01); *G06V 40/28* (2022.01); *H04R 1/08* (2013.01); *H04R 3/005* (2013.01)

(58) Field of Classification Search
CPC .... H04N 23/695; G06V 40/176; G06V 40/23; G06V 40/28; H04R 1/08; H04R 3/005; A63F 13/213; A63F 13/215; A63F 13/424; A63F 13/79; A63F 13/27

USPC ......................................................... 348/169
See application file for complete search history.

(56) References Cited

U.S. PATENT DOCUMENTS

| | | | |
|---|---|---|---|
| 6,219,645 B1* | 4/2001 | Byers | G10L 15/02 |
| | | | 704/275 |
| 8,150,063 B2 | 4/2012 | Chen et al. | |
| 8,395,653 B2 | 3/2013 | Feng et al. | |
| 8,787,113 B2 | 7/2014 | Turbahn et al. | |
| 9,185,361 B2 | 11/2015 | Curry | |
| 9,445,193 B2 | 9/2016 | Tico et al. | |
| 10,074,251 B2 | 9/2018 | Oh et al. | |
| 10,601,385 B2 | 3/2020 | Moberg et al. | |
| 11,184,560 B1* | 11/2021 | Mese | G10L 17/00 |
| 11,259,112 B1 | 2/2022 | Marti et al. | |
| 2011/0154266 A1 | 6/2011 | Friend et al. | |
| 2015/0088515 A1* | 3/2015 | Beaumont | G10L 17/06 |
| | | | 704/251 |

(Continued)

OTHER PUBLICATIONS

PCT/US2023/017107 International Search Report and Written Opinion mailed Jun. 19, 2023.

*Primary Examiner* — Gims S Philippe
(74) *Attorney, Agent, or Firm* — Fletcher Yoder, PC

(57) ABSTRACT

A system includes a gimbal, a shotgun microphone coupled to the gimbal, a camera, and at least one processor. The at least one processor is configured to receive data indicative of an image or video feed from the camera. The at least one processor is also configured to determine, based on the data indicative of the image or video feed, a primary human speaker among a group of humans and a location of the primary human speaker. The at least one processor is also configured to control the gimbal to point the shotgun microphone at the location of the primary human speaker.

19 Claims, 8 Drawing Sheets

(56) References Cited

U.S. PATENT DOCUMENTS

| | | | |
|---|---|---|---|
| 2015/0167956 A1* | 6/2015 | Vaidya | H04R 1/083 |
| | | | 381/92 |
| 2016/0277863 A1* | 9/2016 | Cahill | G01S 3/8083 |
| 2017/0186441 A1 | 6/2017 | Wenus et al. | |
| 2020/0192485 A1* | 6/2020 | VanBlon | G06F 3/013 |
| 2021/0134293 A1 | 5/2021 | Zurek et al. | |
| 2021/0256987 A1* | 8/2021 | Edlin | H04R 1/406 |
| 2021/0279475 A1* | 9/2021 | Tusch | H04L 63/0861 |

* cited by examiner

BODY LANGUAGE DETECTION AND MICROPHONE CONTROL

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Entertainment venues, such as theme parks, amusement parks, theaters, movie theaters, stadiums, concert halls, and the like, have been created to provide an audience of guests with various immersive experiences. These entertainment venues may include show attractions (e.g., movies, plays, rides, games) that provide the guests with the immersive experiences. For example, a traditional show attraction may enable the guests to interact with various show elements of the traditional show attraction. However, it is now recognized that traditional show attractions are not adequately designed to enable accurate and/or consistent interactions of a specific guest in the audience with the various show elements of the traditional show attractions. For example, ambient noise from the audience may reduce a range or flexibility of interactions of a specific guest with the show elements of the traditional show attraction. Accordingly, it is now recognized that improved interactive show attractions are desired.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from embodiments set forth below.

In an embodiment, a system includes a gimbal, a shotgun microphone coupled to the gimbal, a camera, and at least one processor. The at least one processor is configured to receive data indicative of an image or video feed from the camera, determine, based on the image video feed, a location of a primary human speaker, and actuate the gimbal to point the shotgun microphone at the location of the primary human speaker.

In an embodiment, a system includes a microphone assembly, a camera, and at least one processor. The at least one processor is configured to receive data indicative of an image or video feed from the camera, and to determine, based on the data indicative of the image or video feed, a primary human speaker among a group of humans and a location of the primary human speaker. The at least one processor is also configured to control the microphone assembly based on the location of the primary human speaker.

In an embodiment, one or more tangible, non-transitory, computer readable media includes instructions thereon that, when executed by at least one processor, cause the at least one processor to perform various operations. The operations include receiving, from a camera, data indicative of an image or video feed capturing a group of humans. The operations also include determining, via a body language detection algorithm that receives the data indicative of the image or video feed, a primary human speaker among the group of humans. The operations also include controlling a motorized gimbal to point a shotgun microphone at the primary human speaker among the group of humans. The operations also include receiving, via the shotgun microphone, data indicative of a sound captured by the shotgun microphone. The operations also include determining, based on the data indicative of the sound captured by the shotgun microphone, a command uttered by the primary human speaker. The operations also include controlling a show element based on the command.

DRAWINGS

These and other features, aspects, and advantages of the present disclosure will become better understood when the following detailed description is read with reference to the accompanying drawings in which like characters represent like parts throughout the drawings, wherein.

Figure 6:
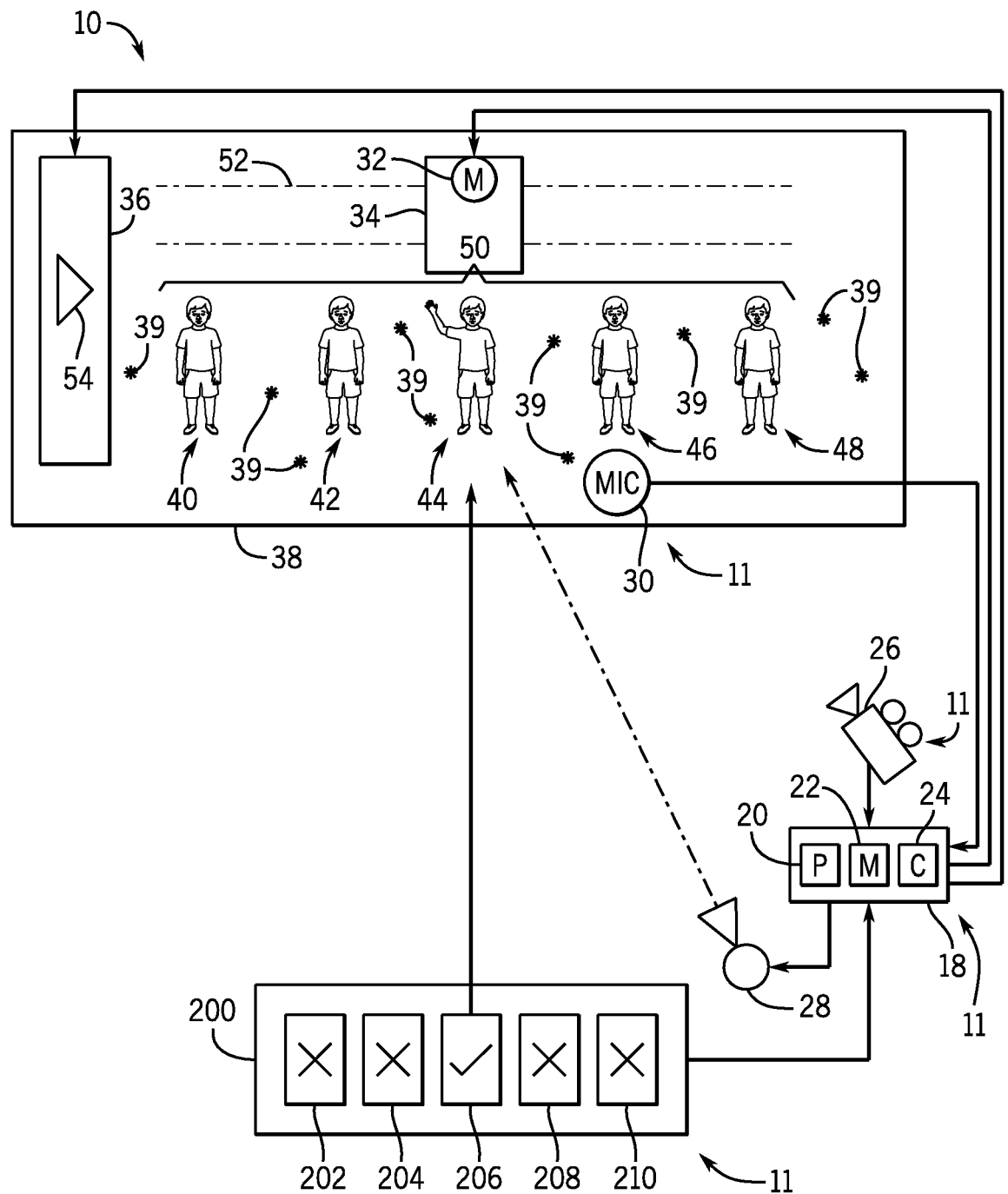
FIG. 6 is a schematic illustration of a show attraction including a control assembly configured to identify a primary human speaker among a group of humans and select a microphone corresponding to the primary human speaker from a microphone array, in accordance with an aspect of the present disclosure.
Figure 7:
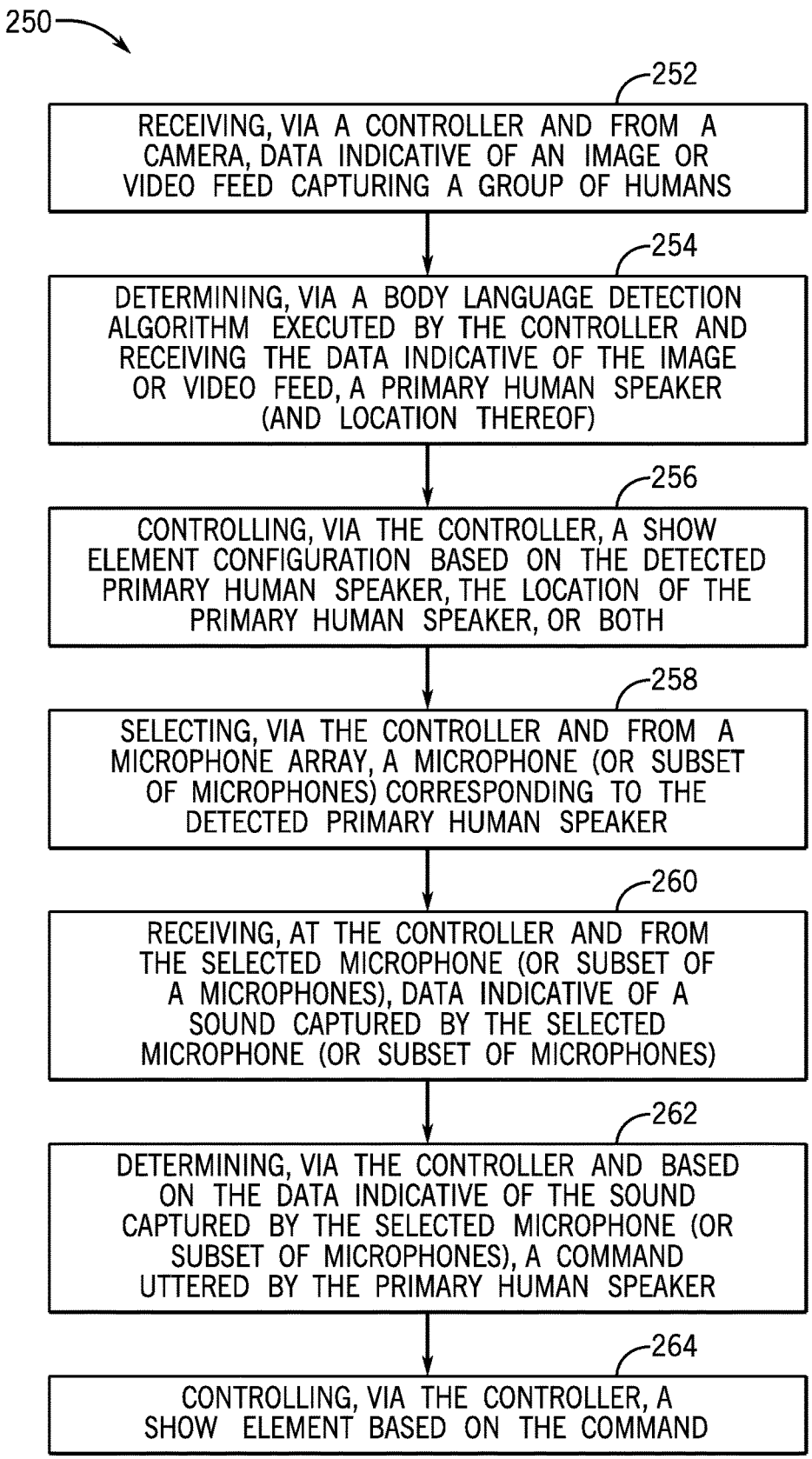
Figure 8:
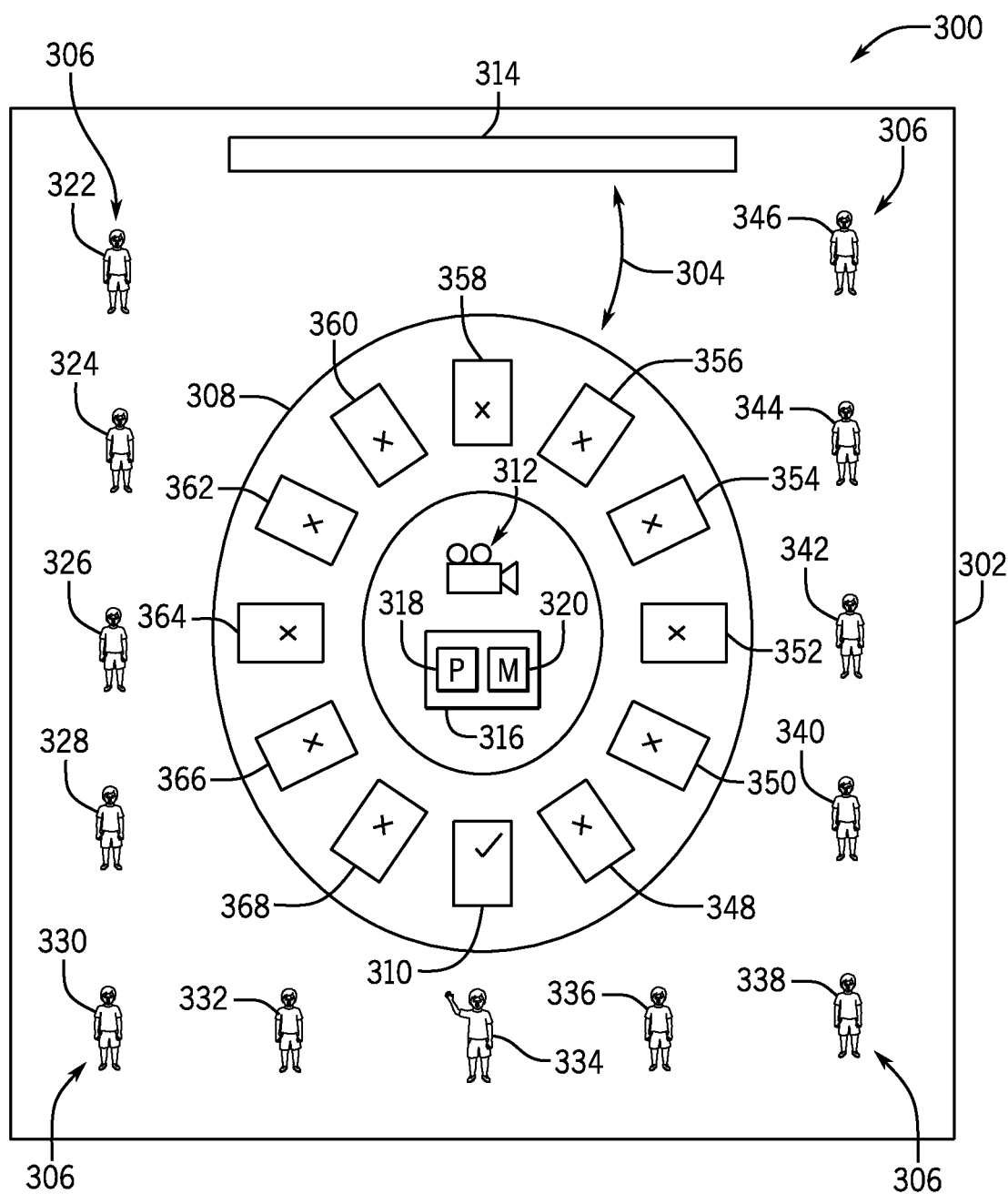

FIG. 7 is a process flow diagram illustrating a method of controlling the show attraction of FIG. 6 to identify the primary human speaker, select the microphone corresponding to the primary human speaker from the microphone array, and control show elements of the show attraction, in accordance with an aspect of the present disclosure; and FIG. 8 is a schematic illustration of a conference call system including a control assembly configured to identify a primary human speaker among a group of humans and select a microphone corresponding to the primary human speaker from a microphone array, in accordance with an aspect of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to show attraction systems configured to capture commands from a primary human speaker among a group of humans and control show elements of a show attraction based on the commands from the primary human speaker. More particularly, the present disclosure relates to a control assembly that identifies the primary human speaker among the group of humans (e.g., via processing of an image or video feed of the group of humans), directs a shotgun microphone at the identified primary human speaker, and controls one or more show elements of the show attraction based on a command received by the shotgun microphone from the identified primary human speaker.

Entertainment venues may include various show attractions (e.g., movies, plays, rides, games) that enable interactions between guests attending the show attraction and various show elements of the show attraction. For example, a guest may utter a command that is received by a microphone of the show attraction, and a control assembly of the show attraction may implement a change to one or more show elements (e.g., a physical show prop, an electronic screen, show lights, and the like) based on the command. Unfortunately, utilizing voice commands can be problematic due to ambient noise that interferes with the voice commands. For example, the show attraction may be attended by a group of guests where a subset of the group, such as a single guest, is tasked with uttering the command captured by the microphone and executed by the show attraction. Because of ambient noise generated by the other guests and/or other sources, it can be difficult to isolate the command from the ambient noise.

In accordance with the present disclosure, a camera may be employed by the show attraction to capture an image or video feed of the group of guests, referred to below as a group of humans. A controller may receive, from the camera, data indicative of the image or video feed, and identify a primary human speaker of the group of humans based on the data indicative of the image or video feed. For example, while the group of humans may be in conversation or otherwise generating noise through a duration of the show attraction, one or more humans of the group of humans may be tasked at various intervals of the show attraction with uttering a command implemented by the show attraction. The controller may execute a body language detection algorithm that receives the data indicative of the image or video feed and identifies, based on the data, a primary human speaker (e.g., the speaker uttering the command) from the group of humans. Indeed, body language detection algorithms can be employed to detect various body language, such as facial expressions, hand gestures, head gestures, body postures, body movements, body orientations, body positions, and the like, indicative of a primary (e.g., active, controlling, or dominant) human speaker. That is, certain types of body language may be indicative of a primary (e.g., active, controlling, or dominant) speaker, whereas other types of body language may be indicative of a secondary (e.g., passive, subdued, or deferential) speaker or non-speaker.

In some embodiments, the show attraction may call for (or otherwise instigate) certain body language that indicates the primary human speaker called upon to utter a command. For example, the show attraction may instruct or otherwise call upon a guest to wave her hand or nod her head, which can be detected via the body language detection algorithm executed by the controller based on the data indicative of the image or video feed. Additionally or alternatively, the show attraction may instruct or otherwise call upon a guest to wave a wand or other prop, where the waving motion can be detected via the body language detection algorithm executed by the controller based on the data indicative of the image or video feed to identify the primary human speaker from the group of humans. In addition to identifying the primary human speaker, the controller may identify a location of the primary human speaker based on the data indicative of the image or video feed. For example, various components of the show attraction (e.g., the camera) may include stationary positions or origin points known by the controller and configured to enable the controller to determine or infer the location of the primary human speaker within the show attraction.

After identifying the primary human speaker and the location of the primary human speaker, the controller may control various show elements of the show attraction and/or a motorized gimbal (or other motion platform) coupled to a shotgun microphone to direct the shotgun microphone at the primary human speaker. Focusing first on the various show elements of the show attraction, the controller may control, for example, an electronic display, a physical show prop, and/or show lights based on the identification of the primary human speaker and a location thereof. The electronic display may be controlled, for example, to present a digital avatar having a particular characteristic, such as a particular shape, color, size, brightness, directionality, or the like, corresponding to the primary human speaker. The physical show prop may be controlled, for example, to a position adjacent the location of the primary human speaker. The show lights may be controlled, for example, to shine a spotlight toward the location of the primary human speaker. Other show elements controlled based on identification of the primary human speaker and the location of the primary human speaker may be employed in accordance with the present disclosure.

As noted above, the controller also controls a motorized gimbal (or other motion platform) coupled to a shotgun microphone to direct the shotgun microphone at the primary human speaker (also referred to as the primary speaker). "Shotgun microphone," as would be understood by one of ordinary skill in the art, is utilized in the present disclosure to refer to a type of relatively highly directional microphone configured to capture sound in a limited area and/or in a limited directional range. Shotgun microphones can be contrasted with other types of microphones, such as omnidirectional microphones, which are configured to capture sound from many directions. Because other types of microphones capture sound from many directions at relatively comparable intensities, they are susceptible to capturing ambient noise that interferes with the target sound (e.g., the command from the primary speaker) intended to be captured. Accordingly, shotgun microphones may provide the advantages of excluding ambient noise and better capturing the target sound (e.g., the command from the primary speaker). Further, sound signals captured via other types of microphones may require relatively intensive and expensive processing software to filter the ambient noise from the target sound. Accordingly, in accordance with present embodiments, signal processing for sound signals captured by the shotgun microphone may be relatively cost effective and efficient.

As a non-limiting example, the shotgun microphone may include a relatively long tube (e.g., a tube having a length of approximately 6 inches [15.2 centimeters] to 30 inches [76.2 centimeters]), a group of phase cancelling holes or slits through the tube, and a diaphragm disposed inside the tube. The diaphragm may receive the sound from the phase cancelling holes or slits and, in some embodiments, an open front end of the tube. In general, sounds originating from a location at which the shotgun microphone points are in phase and captured to a greater extent than sounds originating from other locations that are out of phase and captured to a lesser extent (or not at all). Thus, the shotgun microphone is generally better at excluding ambient noise than other types of microphones, such as an omnidirectional microphone.

After the shotgun microphone is directed at the identified primary human speaker, the shotgun microphone may capture sound generated by the primary human speaker and communicate data indicative of the captured sound to the controller. The controller may determine, based on the data indicative of the captured sound, a command that was uttered by the primary human speaker. For example, the controller may execute a speech recognition algorithm that receives the data indicative of the captured sound to determine the command uttered by the primary human speaker. Based on the command, the controller may control one or more show elements of the show attraction, such as the electronic screen, the physical show prop, the show lights, or other show elements. As a non-limiting example, the primary human speaker may utter a command to change a color of the digital avatar presented on the electronic screen, to change a position of the physical show prop, or to change a direction, intensity, or color of the show lights. Other commands associated with control of the show elements can also be employed in accordance with the present disclosure.

In some embodiments, control of the show elements based on the identification of the primary human speaker (or location thereof) and control of the show elements based on the command uttered by the primary human speaker may be implemented in combination or succession. As a non-limiting example, the controller may cause the digital avatar presented on the electronic display to include a shape (e.g., a triangle) corresponding to the identification of the primary human speaker, and the controller may cause the digital avatar presented on the electronic display to adjust a separate characteristic (e.g., change to a larger size) corresponding to the command uttered by the primary human speaker. Thus, the digital avatar presented on the electronic screen may include a larger size of the triangular shape after the command uttered by the primary human speaker is executed. Other control features can also be employed by the present disclosure, such as those described in detail below with reference to the drawings. In general, presently disclosed embodiments operate to improve interactions of guests attending the show attraction with show elements of the show attraction, reduce a cost or processing complexity associated with said interactions, and/or improve a guest experience by way of said interactions, relative to traditional embodiments. These and other features are described in detail below with reference to the drawings.

Figure 1:
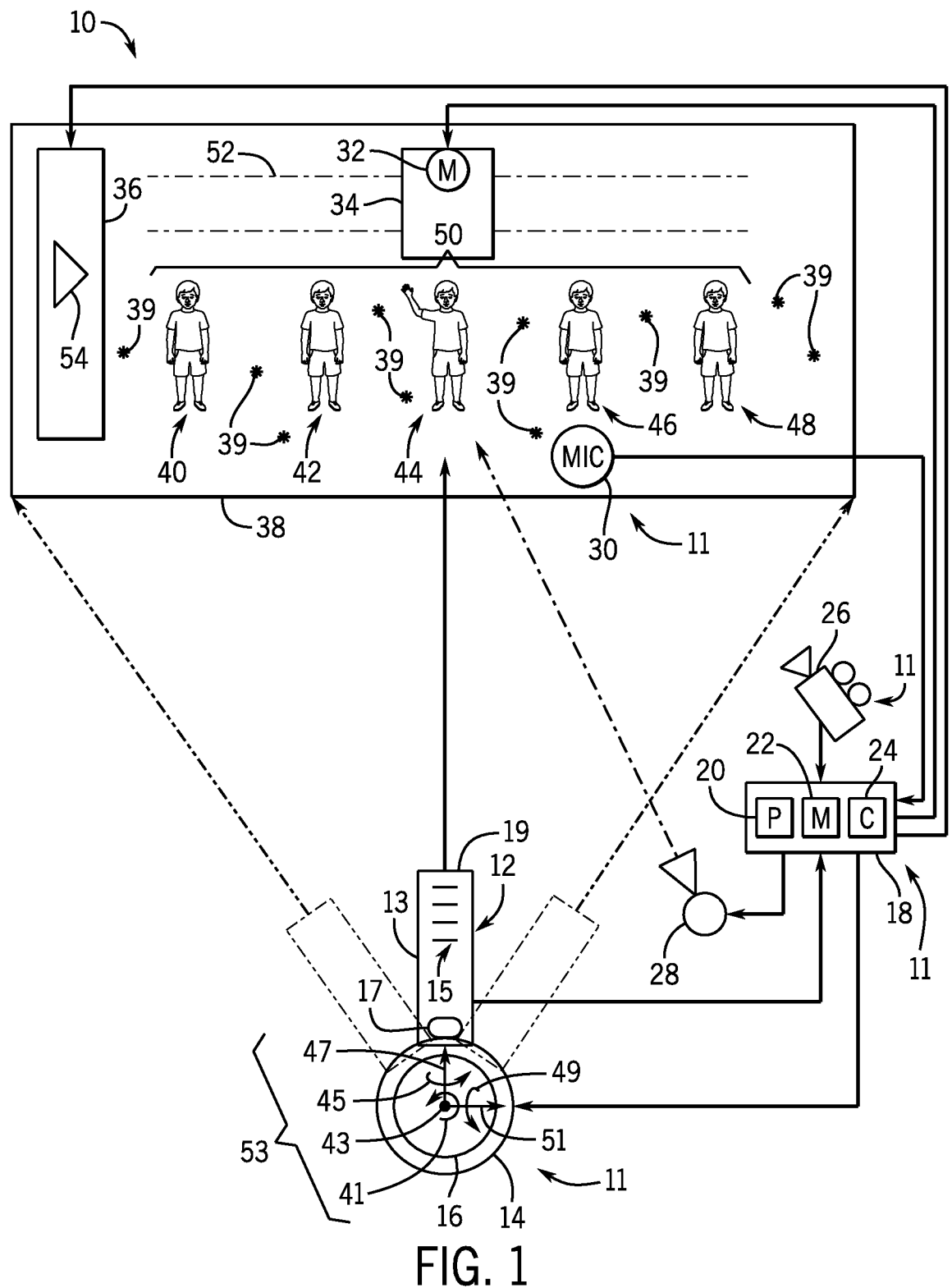
FIG. 1 is a schematic illustration of a show attraction including a control assembly configured to identify a primary human speaker among a group of humans and control a shotgun microphone to point toward a location of the primary human speaker, in accordance with an aspect of the present disclosure.

FIG. 1 is a schematic illustration of an embodiment of a show attraction 10 including a control assembly 11 configured to identify a primary human speaker among a group of humans and control a shotgun microphone 12 to point toward a location of the primary human speaker. In the illustrated embodiment, the control assembly 11 includes, among other features, the shotgun microphone 12 coupled to a gimbal 14 having a motor 16. As will be appreciated in view of the description below, the shotgun microphone 12 is employed in accordance with the present disclosure to improve sound capture from a specific guest in an audience of guests by excluding ambient noise associated with the audience of guests and other sources. In general, the shotgun microphone 12 is a type of relatively highly directional microphone configured to capture sound in a limited area and/or in a limited directional range. The shotgun microphone 12 can be contrasted with other types of microphones, such as omnidirectional microphones, which are configured to capture sound from many directions. Because other types of microphones, such as omnidirectional microphones, capture sound from many directions, they are susceptible to capturing ambient noise that interferes with the target sound intended to be captured. Accordingly, the shotgun microphone 12 may provide the advantages of excluding ambient noise, better capturing the target sound, and requiring less intensive and expensive signal processing relative to other types of microphones that capture higher levels of ambient noise.

As a non-limiting example, the shotgun microphone 12 may include a tube 13 (e.g., a tube having a length of approximately 6 inches [15.2 centimeters] to 30 inches [76.2 centimeters]), a group of phase cancelling holes or slits 15 through the tube 13, and a diaphragm 17 disposed inside the tube 13. The diaphragm 17 may receive the sound from the phase cancelling holes or slits 15 and, in some embodiments, an open front end 19 of the tube 13. In general, sounds originating from a location at which the shotgun microphone 12 points are in phase and captured to a greater extent than sounds originating from other locations that are out of phase and captured to a lesser extent (or not at all). Thus, the shotgun microphone 12 is generally better at excluding ambient noise than other types of microphones, such as an omnidirectional microphone. As described in detail below, the show attraction 10 includes the control assembly 11 configured to identify a primary human speaker among a group of humans, point the shotgun microphone 12 at the primary human speaker, and execute various control features of show elements of the show attraction 10. Accordingly, the shotgun microphone 12 captures the sound generated by the primary human speaker without high levels of ambient noise relative to other types of microphones.

For example, the show attraction 10 includes a controller 18 having processing circuitry 20, memory circuitry 22, and communication circuitry 24. The memory circuitry 22 includes instructions stored thereon that, when executed by the processing circuitry 20, cause the processing circuitry 20 to perform various operations described in detail below. The communication circuitry 24 is configured to enable communication between the controller 18 and various other aspects of the show attraction 10. For example, the communication circuitry 24 may enable communication between the controller 18 and the motor 16 of the gimbal 14, the shotgun microphone 12 coupled to the gimbal 14, a camera 26 of the control assembly 11, show lights 28, an additional microphone 30 (e.g., an omnidirectional microphone) of the control assembly 11, a show prop motor 32 of a physical show prop 34 (e.g., a train, a trolley, or an animated figure), an electronic screen 36, or any combination thereof.

In accordance with the present disclosure, the camera 26 is configured to provide, to the controller 18, data indicative of an image or video feed of a staging area 38 of the show attraction 10. Guests (e.g., a first human 40, a second human 42, a third human 44, a fourth human 46, and a fifth human 48) may be located in the staging area 38 and captured in the image or video feed by the camera 26. The first human 40, the second human 42, the third human 44, the fourth human 46, and the fifth human 48 may be collectively referred to as a group of humans 50. The controller 18 may identify, based on the data indicative of the image or video feed received from the camera 26, a primary human speaker among the group of humans 50. For example, the controller 18 may execute a body language detection algorithm that receives the data indicative of the image or video feed, where the body language detection algorithm identifies the primary human speaker among the group of humans 50. As will be appreciated in view of later discussion, the primary human speaker may be identified via execution of the body language detection algorithm based on detected facial expressions indicative of a primary (or active) human speaker, hand gestures indicative of a primary (or active) human speaker, head gestures indicative of a primary (or active) human speaker, body postures indicative of a primary (or active) human speaker, body movements indicative of a primary (or active) human speaker, body orientations indicative of a primary (or active) human speaker, and the like. Indeed, certain types of body language may be naturally indicative of a primary (e.g., active, controlling, or dominant) speaker, whereas other types of body language (or a lack of detected body language) may be indicative of a secondary (e.g., passive, subdued, or deferential) speaker or non-speaker.

Further, in some embodiments, the show attraction 10 may call for (or otherwise instigate) certain body language that indicates the primary human speaker. For example, the show attraction 10 may instruct or otherwise call upon the primary human speaker to wave her hand, wave a wand or other prop, nod her head, or the like, which can be detected via the body language detection algorithm executed by the controller 18 based on the data indicative of the image or video feed received from the camera 26. Further still, in some embodiments, audio captured by the additional microphone 30 (e.g., an omnidirectional microphone) may be analyzed by the controller 18 in addition to the data indicative of the image or video feed to facilitate identification of the primary human speaker. That is, while the audio captured by the additional microphone 30 may not be utilized for determining commands uttered by the primary human speaker, the audio captured by the additional microphone 30 may be utilized in combination with the data indicative of the image or video feed to facilitate identification of the primary human speaker.

In the illustrated embodiment, the controller 18 determines that the third human 44 among the group of humans 50 is the primary human speaker based on a hand gesture (e.g., a wave), and ascertains a location of the primary human speaker relative to the shotgun microphone 12 (or an origin point of the shotgun microphone 12). Indeed, the camera 26 may be disposed at a stationary location such that the location of the identified primary human speaker relative to the camera 26 is known. Further, the location of the shotgun microphone 12 (or an origin point of the shotgun microphone 12) may also be known, such that the location of the primary human speaker relative to the shotgun microphone 12 (or the origin point of the shotgun microphone 12) can be determined, inferred, or interpolated based on the location of the primary human speaker relative to the camera 26. Other localization techniques can also be used in accordance with the present disclosure. For example, the staging area 38 may include various unique indicators 39 that have known locations distributed about the staging area 38, and that are captured in the image or video feed by the camera 26. The location of the primary human speaker, such as the third human speaker 44, can be determined based on a proximity of the primary human speaker to one of the unique indicators 39.

In accordance with the present disclosure, the controller 18 controls, based on the identification of the third human 44 as the primary human speaker and the location thereof, the shotgun microphone 12 to point toward the location of the third human 44. The shotgun microphone 12 may be controllable, via the gimbal 14 and corresponding motor 16, to be rotated in a first circumferential direction 41 about a first axis 43, in a second circumferential direction 45 about a second axis 47, and a third circumferential direction 49 about a third axis 51. The shotgun microphone 12 may also be controllable, via the gimbal 14 and corresponding motor 16, to be translated along the first axis 43, the second axis 47, and the third axis 51.

In an embodiment, multiple instances of the motor 16 may be employed to enable the above-described movement of the shotgun microphone 12 via the gimbal 14. Further, it should be noted that the gimbal 14, as used herein, may refer to any structural mounting structure capable of enabling translation and/or rotation of the shotgun microphone 12 (e.g., via actuation by the one or more motors 16). Further still, it should be noted that the shotgun microphone 12, the gimbal 14, and the motor 16 may be collectively referred to as a microphone assembly 53. In general, the above-described rotation and/or translation of the shotgun microphone 12, via the gimbal 14 and corresponding motor(s) 16, may enable the shotgun microphone 12 to be pointed at any or essentially any location included in the staging area 38. In the illustrated embodiment, the shotgun microphone 12 is pointed at the third human 44 based on the third human 44 being identified as the primary human speaker. Accordingly, sound captured by the shotgun microphone 12 includes the sound generated by the third human 44 and excludes (or includes to a lesser extent) the ambient noise generated by the first human 40, the second human 42, the fourth human 46, and the fifth human 48 and/or other ambient noise sources.

Before continuing with discussion of the shotgun microphone 12 capturing commands uttered by the primary human speaker (e.g., the third human 44 in the illustrated embodiment), it should be noted that show elements of the show attraction 10 may be controlled based on identification of the primary human speaker and location thereof. For example, the controller 18 may control the electronic screen 36 to present a digital avatar 54 corresponding to the third human 44 being the primary human speaker. In the illustrated embodiment, the triangular shape of the digital avatar 54 corresponds to the third human 44, whereas other shapes of the digital avatar 54 may correspond to the first human 40 (e.g., circular shape), the second human 42 (e.g., rectangular shape), the fourth human 46 (e.g., star shape), and the fifth human 58 (e.g., pentagon shape). Additionally or alternatively, other characteristics of the digital avatar 54 may be controlled to correspond to the identification of the primary human speaker. For example, in an embodiment, a directionality of the digital avatar 54 may be controlled based on the identification of the primary human speaker (e.g., such that the digital avatar 54 faces the primary human speaker). Further, in an embodiment, the digital avatar 54 may include a digital representation of a human, a robot, an animal, or some other living creature, and may be presented on the electronic screen 36 such that it faces the location of the primary human speaker.

Still other show elements may be controlled based on the identification of the primary human speaker and location thereof. For example, the controller 18 may control the show lights 28 to correspond to identification of the third human 44 as the primary human speaker, such as controlling the show lights 28 to cause a spotlight to be directed toward the third human 44. Further, the controller 18 may control the physical show prop 34 (e.g., a train, a trolley, or an animated figure) to move the physical show prop 34 (e.g., along a track 52) to a position adjacent the identified primary human speaker, as shown.

Figure 2:
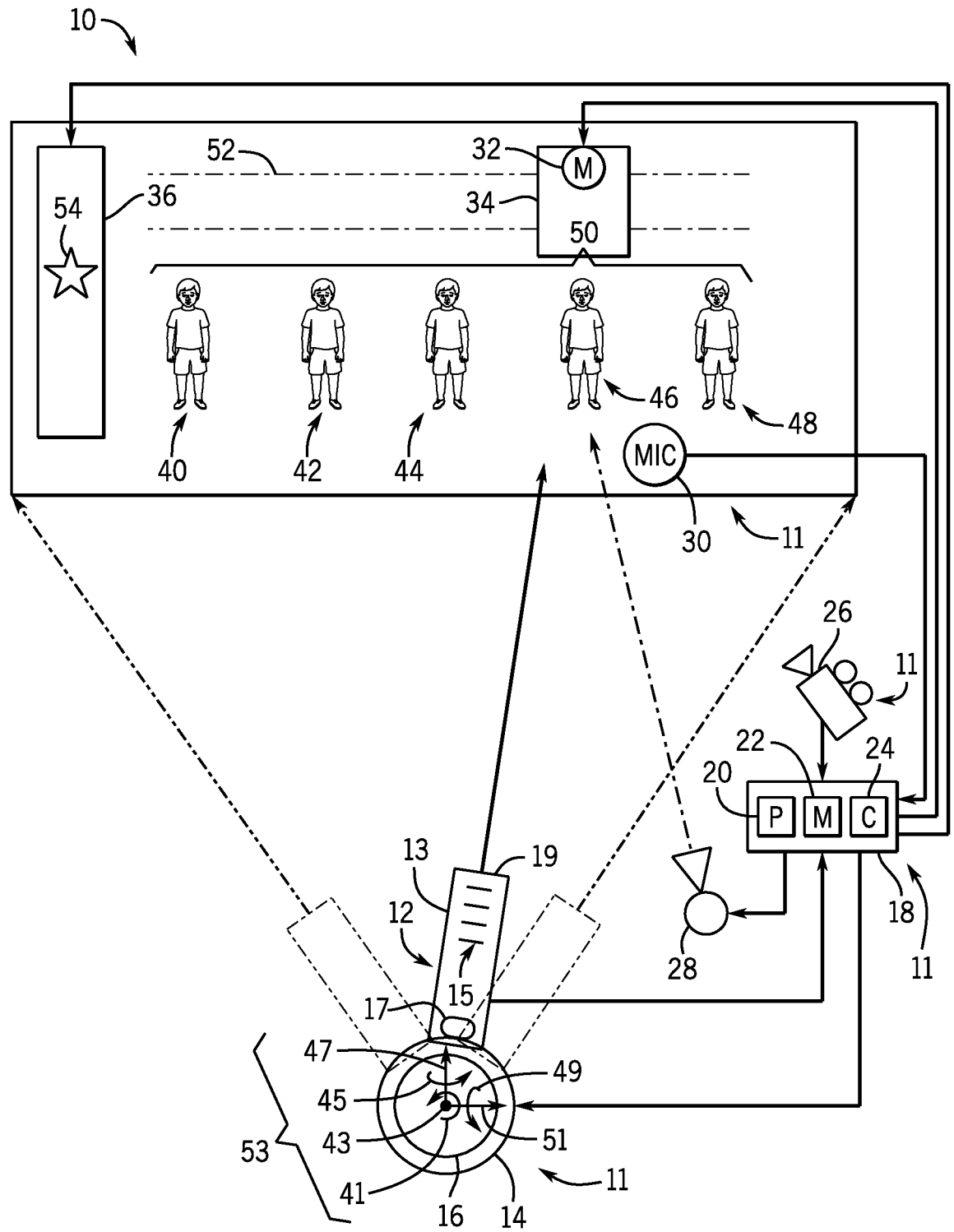
FIG. 2 is a schematic illustration of the show attraction of FIG. 1, where the control assembly is configured to identify a new primary human speaker among the group of humans and control the shotgun microphone to point toward a new location of the new primary human speaker, in accordance with an aspect of the present disclosure.

An example of the show elements being controlled differently based on the primary human speaker deviating from the third human 44 is illustrated in FIG. 2. For example, in FIG. 2, the fourth human 46 from the group of humans 50 is identified as the primary human speaker based on a facial expression, such as a smile, indicative of the primary human speaker. Based on the identification of the fourth human 46 as the primary human speaker in FIG. 2, the controller 18 controls the physical show prop 34 (e.g., a train, a trolley, or an animated figure), such as along the track 52, to a position adjacent the fourth human 46. Based on the identification of the fourth human 46 as the primary human speaker in FIG. 2, the controller 18 also controls the electronic screen 36 to display the digital avatar 54 corresponding to the fourth human 46 (e.g., having a star shape), and the show lights 28 to shine a spotlight on the fourth human 46.

As shown in both of FIGS. 1 and 2, the shotgun microphone 12 is pointed at the location of the identified primary human speaker (e.g., the third human 44 in FIG. 1 and the fourth human 46 in FIG. 2). The controller 18 may receive, from the shotgun microphone 12, data indicative of sound captured by the shotgun microphone 12. As previously described, because of the directional nature of the shotgun microphone 12, a relatively large portion of the sound captured by the shotgun microphone 12 may originate from the primary human speaker at which the shotgun microphone 12 is pointed, as opposed to sources of ambient noise (e.g., the others in the group of humans 50). It should be noted that, in an embodiment, pointing of the shotgun microphone 12 may be tuned at least in part based on the sound captured by the shotgun microphone 12. For example, the shotgun microphone 12 first may be controlled based on the identification of the primary human speaker and the location thereof. If sound captured by the shotgun microphone 12 includes ambient noise at intensities above an ambient noise threshold, pointing of the shotgun microphone 12 may be controlled (e.g., tuned) in increments to locate a position in which ambient noise is reduced below the ambient noise threshold. As will be appreciated in view of the description below, the controller 18 may determine, based on data indicative of the sound captured by the shogun microphone 12, a command uttered by the primary human speaker, and then execute the command.

Figure 3:
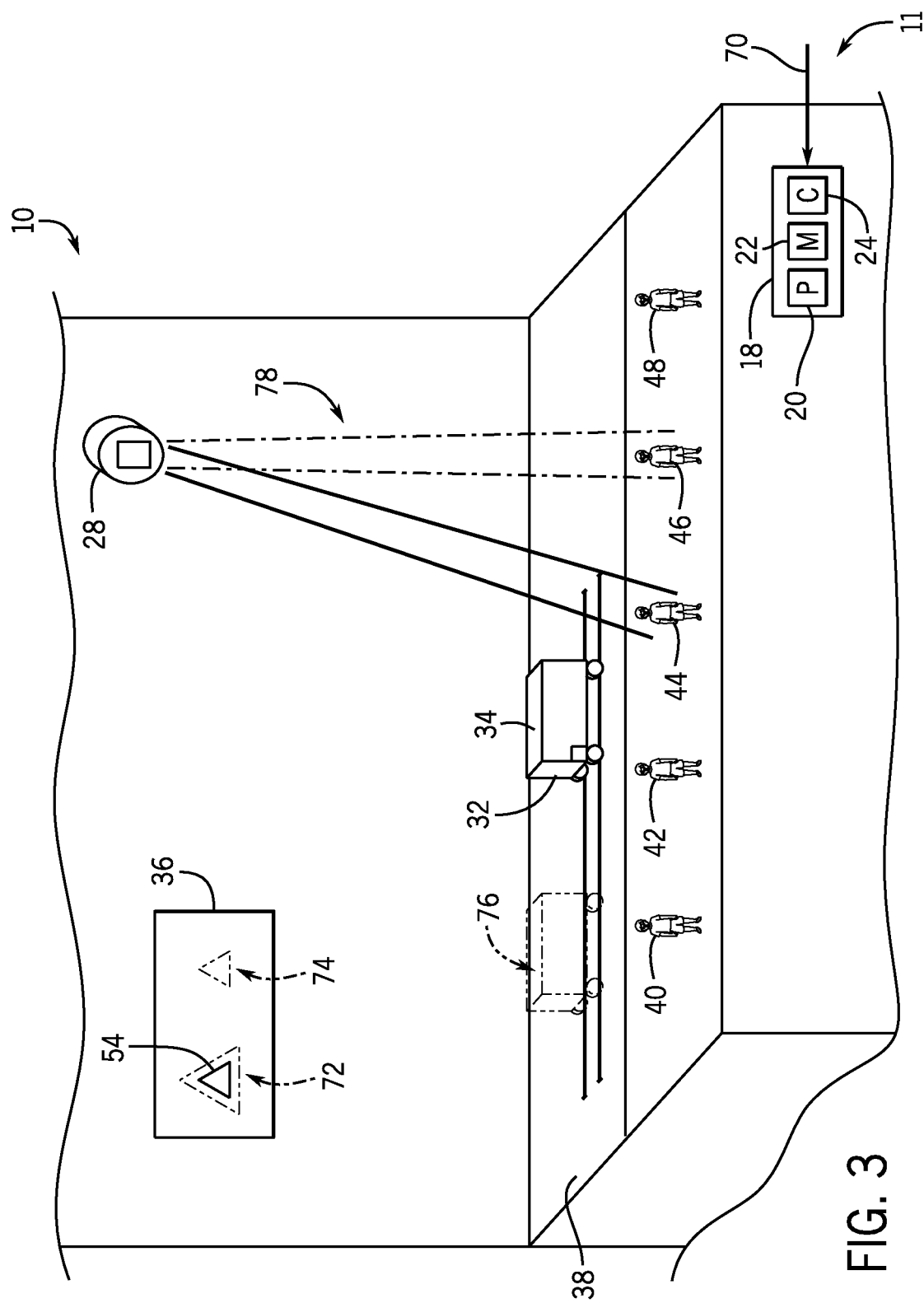
FIG. 3 is a schematic perspective view of a portion of the show attraction of FIG. 1, where the control assembly is configured to control an aspect of the show attraction based on a command received, via the shotgun microphone, from the primary human speaker, in accordance with an aspect of the present disclosure.

For example, FIG. 3 is a schematic illustration of an embodiment of a portion of the show attraction 10 of FIG. 1, where the control assembly 11 is configured to control an aspect of the show attraction 10 based on the command received from the primary human speaker. As previously described, the controller 18 of the control assembly 11 may receive a data input 70 indicative of the sound captured by the shotgun microphone 12 in FIGS. 1 and 2, and execute a speech recognition algorithm that determines or infers the command based on the data input 70. The command may include an instruction to control one of the show elements of the show attraction 10. For example, the command may include an instruction to control a characteristic of the digital avatar 54 presented on the electronic screen 36, such as a size, shape, color, brightness, or directionality of the digital avatar 54, a position or other characteristic of the physical show prop 34 (e.g., a train, a trolley, or an animated figure), and a direction, color, intensity, brightness, or other characteristic of the show lights 28.

In an embodiment, one or more of the show elements may be controlled based on both the identification of the primary human speaker (or location thereof) and the command uttered by the primary human speaker, either in combination or succession. For example, as previously described, the digital avatar 54 presented on the electronic screen 36 in FIG. 1 may include a triangular shape corresponding to identification of the third human 44 as the primary human speaker. The command uttered by the primary human speaker (e.g., the third human 44) may include an instruction to increase a size of the digital avatar 54 such that the electronic screen 36 presents a larger triangular size 72 corresponding to the digital avatar 54, or move a position of the digital avatar 54 such that the electronic screen 36 presents a differently positioned triangle 74 corresponding to the digital avatar 54.

Other changes (e.g., to the shape, the orientation, directionality, etc.) of the digital avatar 54 based on the command from the primary human speaker can also be employed in accordance with the present disclosure. As another example, the digital avatar 54 may include a digital human, robot, or animal that is controlled to face the third human 44 based on identification of the third human 44 as the primary human speaker, and may be controlled to emote or react (e.g., smile, wave, jump, laugh) in response to the command uttered by the third human 44 as the primary human speaker. Other show elements of the show attraction 10 may also be controlled based on the identification of the primary human speaker and the command uttered by the primary human speaker. For example, the physical show prop 34 (e.g., a train, a trolley, or an animated figure) may be moved (e.g., along the track 52) via the show prop motor 32 to a different show prop position 76 based on the command, and a direction 78 of the spotlight generated by the show lights 28 may be changed based on the command. Combining control of the show elements based on both the identification of the primary human speaker (and location thereof) and the command uttered by the primary human speaker may enable a heightened immersive experience of the group of humans 50 in the show attraction 10 relative to traditional systems and methods.

Figure 4:
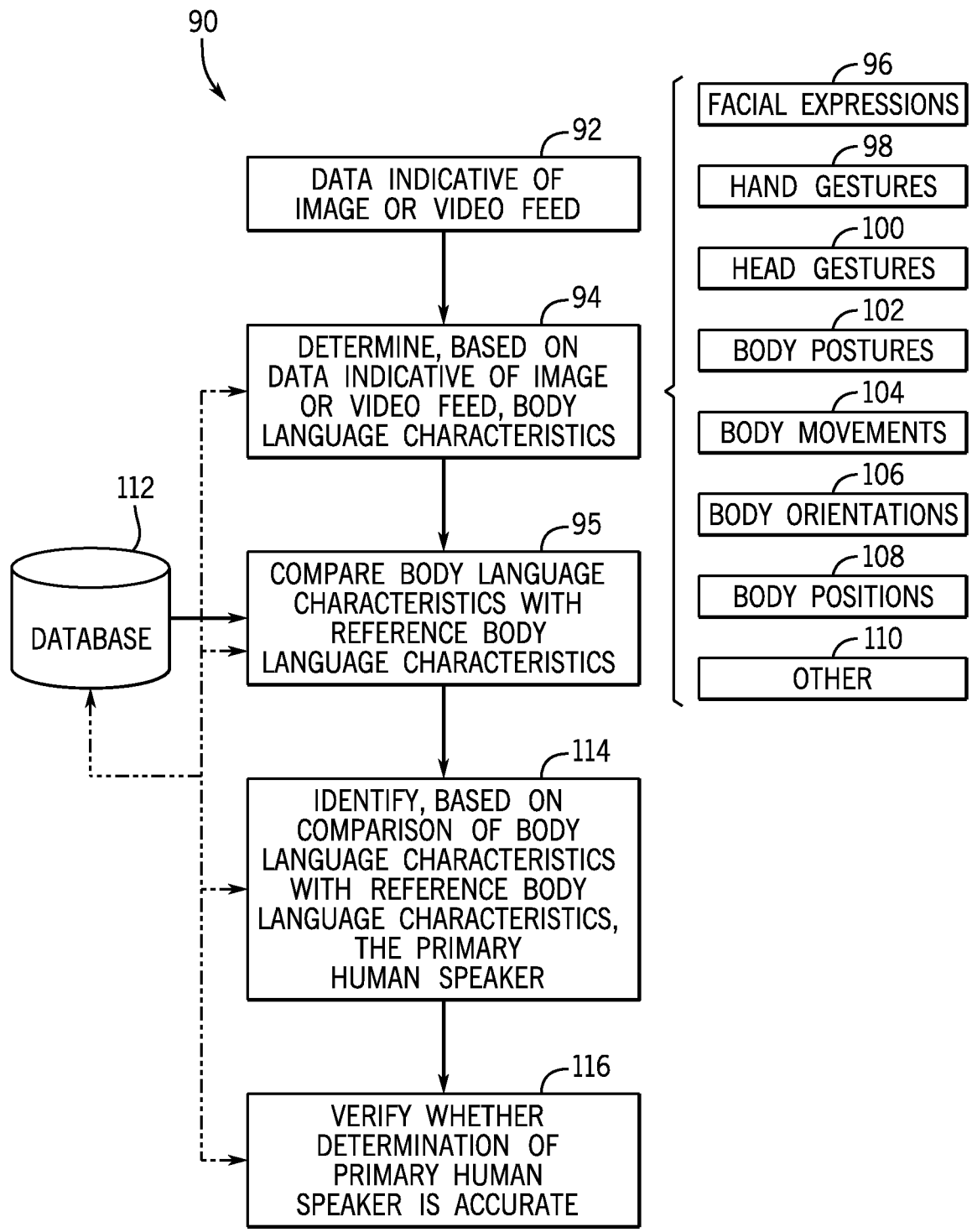
FIG. 4 is a schematic illustration of a body language detection algorithm employed in the control assembly of the show attraction of FIG. 1 to identify the primary human speaker, in accordance with an aspect of the present disclosure.

As previously described, the primary human speaker may be identified from the group of humans 50 based on analysis of an image or video feed via a body language detection algorithm employed by the controller 18. FIG. 4 is a schematic illustration of an embodiment of a body language detection algorithm 90 employed in the show attraction 10 of FIG. 1 to identify the primary human speaker. In the illustrated embodiment, the body language detection algorithm 90 receives a data input (block 92) indicative of an image or video feed and includes a processing step of determining (block 94), based on the data input 92, body language characteristics of a group of humans captured in the image or video feed. For example, the body language characteristics may include facial expressions 96 of each human, hand gestures 98 of each human, head gestures 100 of each human, body postures 102 of each human, body movements 104 of each human, body orientations 106 of each human, body positions 108 of each human, and others 110. The body language characteristics may be determined from the data input 70 based on, for example, computer vision techniques such as three-dimensional (3D) pose analysis or estimation, motion analysis or estimation (e.g., tracking and/or optical flow), shape recognition, facial recognition, feature extraction, and the like.

The body language detection algorithm 90 then compares (block 95) the detected body language characteristics, such as those described above, with reference body language characteristics. In the illustrated embodiment, the reference body language characteristics are stored to a database 112. The reference body language characteristics may include only characteristics indicative of a primary (e.g., active, controlling, or dominant) human speaker. Alternatively, the reference body language characteristics may include a first sub-set of characteristics indicative of the primary human speaker and a second sub-set of characteristics indicative of a secondary (e.g., passive, subdued, or deferential) human speaker or non-speaker.

The body language detection algorithm 90 then identifies (block 114), based on the comparison of the detected body language characteristics with the reference body language characteristics, the primary human speaker. In an embodiment where the reference body language characteristics include those that are indicative of a primary human speaker and those that are indicative of a secondary human speaker (or non-speaker), the body language detection algorithm 90 may operate to exclude members in the group of humans that are identified as secondary human speakers (or non-speakers). Further, humans that are not displaying any detectable body language characteristics may be excluded by the detection algorithm 90 from being identified as the primary human speaker. Additionally, a correspondence (or matching) of detected body language characteristics with reference body language characteristics indicative of a primary human speaker may be utilized by the body language detection algorithm 90 to identify the primary human speaker.

The body language detection algorithm 90 may also include a machine learning or artificial intelligence aspect. For example, the body language detection algorithm 90 may include an operation of verifying (block 116) whether determination of the primary human speaker was accurate. In an embodiment, identification of the primary human speaker may be verified as accurate upon detecting a verifiable command uttered by the identified primary human speaker. Additionally or alternatively, identification of the primary human speaker may be verified as inaccurate upon failure to detect a verifiable command uttered by the identified primary human speaker. Other verifying techniques can also be employed in accordance with the present disclosure. Upon verification of whether the identification of the primary human speaker was accurate, certain aspects employed in the body language detection algorithm 90 can be updated. For example, any of the data processing, comparison, or analysis in blocks 94, 95, and 114 may be updated. As an example, certain types of body language characteristics detected at block 94 may be added or removed in future iterations of the body language detection algorithm 90. Additionally or alternatively, the database 112 storing various reference body language characteristics for comparison with the detected body language characteristics may be updated based upon the verification that occurs at block 116. Updating the body language detection algorithm 90 based on the verification step at block 116 may enable tuning of the body language detection algorithm 90. It should be noted that body language characteristics indicative of a primary human speaker may deviate based on unique cultural or regional expressions, based on progression of body language over time, and the like. By enabling the body language detection algorithm 90 to be updated or modified in view of the verification step at block 116, the body language detection algorithm 90 may be enhanced and/or tailored over time to address changes or distinctions in body language for the above-described reasons.

Figure 5:
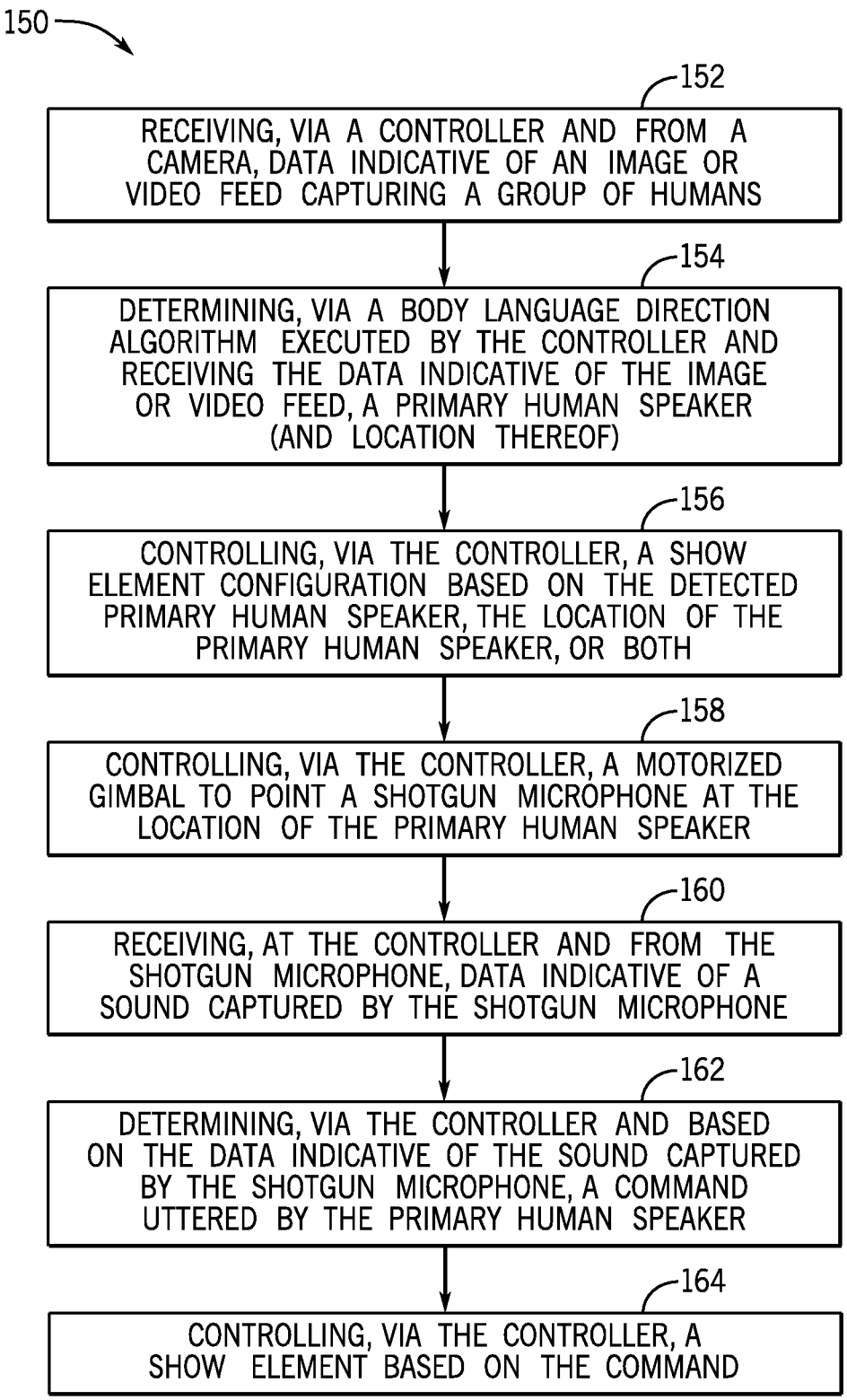
FIG. 5 is a process flow diagram illustrating a method of controlling the show attraction of FIG. 1 to identify the primary human speaker, point a shotgun microphone toward a location of the primary human speaker, and control show elements of the show attraction, in accordance with an aspect of the present disclosure.

In general, the body language detection algorithm 90 may be employed as a part of a larger process employed in the show attraction 10 of FIG. 1 to identify a primary human speaker and control various show elements of the show attraction 10 based at least in part on a command uttered by the primary human speaker. For example, FIG. 5 is a process flow diagram illustrating a method 150 of controlling the show attraction 10 of FIG. 1 to identify the primary human speaker, point a shotgun microphone toward a location of the primary human speaker, and control show elements of the show attraction. The method 150 illustrated in FIG. 5 includes receiving (block 152), via a controller and from a camera, data indicative of an image or video feed capturing a group of humans. For example, the group of humans may be situated in a staging area of the show attraction and the camera may be configured to capture the image or video feed of the staging area.

The method 150 also includes determining (block 154), via a body language detection algorithm executed by the controller and receiving the data indicative of the image or video feed, a primary human speaker (and location thereof) among the group of humans. The body language detection algorithm 90 illustrated in FIG. 4, for example, may be executed by the controller. In general, the body language detection algorithm is configured to detect various body language characteristics of each member of the group of humans, such as facial expressions, hand gestures, head gestures, body postures, body movements, body orientations, body positions, and the like. As previously described, certain types of body language may be indicative of a primary (e.g., active, controlling, or dominant) speaker, whereas other types of body language may be indicative of a secondary (e.g., passive, subdued, or deferential) speaker or non-speaker. The body language detection algorithm may be configured to compare the detected body language characteristics with reference body language characteristics to identify the primary human speaker. In addition to detecting the primary human speaker, the controller may ascertain a location of the primary human speaker, as previously described.

The method 150 also includes controlling (block 156), via the controller, a show element configuration of the show attraction based on the identity of the primary human speaker, a location of the primary human speaker, or both. For example, the controller may be capable of controlling a particular show element to a number of different show element configurations. The controller may select the show element configuration from the number of different show element configurations based on the identity of the primary human speaker, the location of the primary human speaker, or both. As previously described, the controller may control an electronic display, a physical show prop (e.g., a train, a trolley, or an animated figure), show lights, or a combination thereof based on the identification of the primary human speaker and/or a location thereof. In an embodiment, the electronic display may be controlled to present a digital avatar with a characteristic (e.g., size, shape, color, directionality, or the like) corresponding to the primary human speaker or location thereof.

As an example, the digital avatar may be controlled to include a first size based on a first guest being identified as the primary human speaker, and to include a second size based on a second guest being identified as the primary human speaker, where the first size is different than the second size. Additionally or alternatively, the controller may control the physical show prop to a position corresponding to the primary human speaker or location thereof. Further, the controller may control the show lights to shine a spotlight on the primary human speaker. Other controls can also be employed in accordance with the present disclosure.

The method 150 also includes controlling (block 158), via the controller, a motorized gimbal to point a shotgun microphone at the location of the primary human speaker. For example, the motorized gimbal may be controlled to rotate and/or translate the shotgun microphone such that the shotgun microphone points at the location of the primary human speaker. As previously described, the shotgun microphone is configured to capture sound produced by the primary human speaker while excluding ambient noise. Relative to other types of microphones, such as omnidirectional microphones, the shotgun microphone may be better at excluding the ambient noise (e.g., from other members of the group of humans). By better excluding ambient noise, the shotgun microphone may transmit sound signals to the controller that do not require as intensive and expensive signal processing techniques as those associated with other types of microphones, such as omnidirectional microphones.

The method 150 also includes receiving (block 160), via the shotgun microphone, data indicative of a sound captured by the shotgun microphone. As previously described, the sound captured by the shotgun microphone may primarily correspond to sound produced by the primary human speaker, whereas ambient noise may be excluded and/or recorded at relatively low intensity. The method 150 also includes determining (block 162), via the controller and based on the data indicative of the sound captured by the shotgun microphone, a command uttered by the primary human speaker. As previously described, the controller may execute a speech recognition algorithm that determines, based on the data indicative of the sound captured by the shotgun microphone, the command uttered by the primary human speaker. In an embodiment, the speech recognition algorithm may detect a language associated with the command. In another embodiment, the language may be known and the speech recognition algorithm may be directed toward the known language.

The method 150 also includes controlling (block 164), via the controller, a show element based on the command. For example, the electronic screen, the physical show prop (e.g., a train, a trolley, or an animated figure), the show lights, another show element, or any combination thereof may be controlled based on the command uttered by the primary human speaker. In some embodiments, control of the show elements based on the identification of the primary human speaker or location thereof (e.g., at block 156) and control of the show elements based on the command uttered by the primary human speaker (e.g., at block 164) may be implemented in combination or succession. For example, the controller may cause the digital avatar presented on the electronic display to include a shape (e.g., a triangle) corresponding to the identification of the primary human speaker, and the controller may cause the digital avatar presented on the electronic display to include a separate characteristic (e.g., a larger size of the triangular shape) corresponding to the command uttered by the primary human speaker. Alternatively, the show element control based on the command uttered by the primary human speaker may be completely separate from the show element control based on the identification of the primary human speaker. For example, the electronic screen may be controlled to present the digital avatar having certain characteristics based on the identification of the primary human speaker (or location thereof), whereas the physical show prop may be controlled to a position based on the command uttered by the primary human speaker.

FIG. 6 is a schematic illustration of an embodiment of the show attraction 10 including the control assembly 11 configured to identify a primary human speaker (e.g., the third human 44) among a group of humans 50 (e.g., the first human 40, second human 42, third human 44, fourth human 44, and fifth human 48). Further, the show attraction 10 in FIG. 6 includes a microphone array 200, referred to in certain instances of the present disclosure as a microphone assembly, employing a number of microphones, such as a first microphone 202, a second microphone 204, a third microphone 206, a fourth microphone 208, and a fifth microphone 210, where the controller 18 of the control assembly 11 selects one (or a subset) of the microphones 202, 204, 206, 208, 210 in the microphone array 200 based on the identification of the primary human speaker and/or location thereof.

For example, as previously described, the controller 18 may determine that the third human 44 is the primary human speaker based on the body language detection algorithm that processes data indicative of an image or video feed received from the camera 26. Various body language, such as facial expressions, hand gestures, head gestures, body postures, body movements, body orientations, body positions, may be detected and indicative of the primary human speaker. Based on the detection of the third human 44 as the primary human speaker and a location of the third human 44, the controller 18 may select, from the microphone array 200, the third microphone 206 based on a proximity, position, or orientation of the third microphone 206 relative to the third human 44 (or location thereof). For example, the first microphone 202 may correspond to a location of the first human 40, the second microphone 204 may correspond to a location of the second human 42, the third microphone 206 may correspond to a location of the fourth human 44, the fifth microphone 208 may correspond to a location of the fifth human 46, and the sixth microphone 210 may correspond to a location of the sixth human 48. However, it should be noted that the number of microphones in the microphone array 200 may differ from the number of humans in the group of humans 50 located in the staging area 38.

In general, a microphone in the microphone array 200 is selected based on the primary human speaker and/or location of the primary human speaker. The controller 18 may then receive data from the selected microphone 206 and determine, based on the data, a command uttered by the primary human speaker (e.g., the third human 44). In some embodiments, the unselected microphones 202, 204, 208, 210 may be deactivated, unpowered, or otherwise controlled such that the controller 18 does not receive and/or does not consider data from the unselected microphones 202, 204, 208, 210. In this way, ambient or other noise (e.g., from the first human 40, the second human 42, the fourth human 46, and the fifth human 48) may be excluded from interfering with the target audio being captured by the third microphone 206. It should be noted that, in some embodiments, a subset of the microphones 202, 204, 206, 208, 210 may be selected based on identification of the primary human speaker. For example, in response to determining that the third human 44 is the primary human speaker, the controller 18 may receive data from the second microphone 204, the third microphone 206, and the fourth microphone 208, while excluding data from the first microphone 202 and the fifth microphone 210. It should also be noted that the microphones 202, 204, 206, 208, 210 of the microphone array 200 may be directional or shotgun microphones. Further, the microphones 202, 204, 206, 208, 210 may be overhung or front facing such that they are directed toward the staging area 38 without interfering with the show attraction 10 and a corresponding guest experience. Other aspects of the illustrated show attraction 10 (e.g., the show lights 28, the additional microphone 30, the show prop 34 and the track 52, the electronic screen 36, and the unique indicators 39) may be operated the same as, or similar to, the embodiments illustrated in FIGS. 1, 2, and 3.

FIG. 7 is a process flow diagram illustrating an embodiment of a method 250 of controlling the show attraction of FIG. 6 to identify the primary human speaker, select the microphone corresponding to the primary human speaker from the microphone array, and control show elements of the show attraction. In the illustrated embodiment, the method 250 includes receiving (block 252), via a controller and from a camera, data indicative of an image or video feed capturing a group of humans. Block 252 may be the same as, or similar to, block 152 in the method 150 illustrated in FIG. 5 and described in detail above. The method 250 also includes determining (block 254), via a body language detection algorithm executed by the controller and receiving the data indicative of the image or video feed, a primary human speaker (and location thereof) among the group of humans. Block 254 may be the same as, or similar to, block 154 in the method 150 illustrated in FIG. 5 and described in detail above. The method 250 also includes controlling (block 256), via the controller, a show element configuration of the show attraction based on the identity of the primary human speaker, a location of the primary human speaker, or both. Block 256 may be the same as, or similar to, block 156 in the method 150 illustrated in FIG. 5 and described in detail above.

The method 250 also includes selecting (block 258), via the controller and from a microphone array, a microphone (or a subset of microphones) corresponding to the detected primary human speaker. For example, as previously described, the microphone array may have a number of microphones pointing to various known locations of the staging area in which the group of humans reside. Based on the identification of the primary human speaker (and location thereof) among the group of humans, the controller may select a microphone corresponding to the primary human speaker. The other microphones (e.g., unselected microphones) of the microphone array may be deactivated or otherwise excluded. Accordingly, the controller receives and processes audio captured by the selected microphone corresponding to the primary human speaker (or location thereof), which may capture a relatively small amount of ambient noise (e.g., relative to the other unselected microphones of the microphone array).

The method 250 also includes receiving (block 260), at the controller and from the selected microphone, data indicative of sound captured by the selected microphone. As previously described, sound captured by the selected microphone may primarily correspond to sound produced by the primary human speaker, whereas ambient noise may be excluded and/or recorded at relatively low intensity. The method 250 also includes determining (block 262), via the controller and based on the data indicative of the sound captured by the selected microphone, a command uttered by the primary human speaker. As previously described, the controller may execute a speech recognition algorithm that determines, based on the data indicative of the sound captured by the selected microphone, the command uttered by the primary human speaker. The method 250 also includes controlling (block 264), via the controller, a show element based on the command. Block 264 may be the same as, or similar to, block 164 in the method 150 illustrated in FIG. 5 and described in detail above.

FIG. 8 is a schematic illustration of an embodiment of a conference call system 300 deployed in a venue 302, such as a conference room, a meeting room, an auditorium, or some other venue hosting a conference call or similar event. The conference call system 300 includes a control assembly 304 configured to identify a primary human speaker among a group of humans 306 and select, from a microphone array 308, a microphone 310 corresponding to the primary human speaker. The microphone array 308 may be referred to in certain instances of the present disclosure as a microphone assembly. The control assembly 304 also includes the microphone array 308, a camera assembly 312 (e.g., including one or more cameras) configured to capture video or images within the venue 302, a controllable media device 314 (e.g., a television, a projector, a computer, a speaker, or any combination thereof), and a controller 316.

The controller 316 includes a processor 318 and a memory 320. The memory 320 includes instructions thereon that, when executed by the processor 318, cause the processor 318 to perform various functions. For example, the controller 316 is configured to receive, from the camera assembly 312, data indicative of images or video captured by the camera assembly 312. Further, the controller 316 is configured to execute a body language detection algorithm, described in detail above, to determine a primary human speaker from the group of humans 306 in the venue 302. In the illustrated embodiment, the group of humans 306 includes thirteen humans 322, 324, 326, 328, 330, 332, 334, 336, 338, 340, 342, 344, 346. The seventh human 334 is identified as the primary human speaker based on a hand-waving gesture identified by the controller 316 (e.g., via the body language detection algorithm) as being indicative of the primary human speaker.

In response to determining that the seventh human 334 is the primary human speaker, the controller 316 may select, from the microphone array 308, the microphone 310 corresponding to the seventh human 334 (or location thereof). Indeed, the microphone array 308 in the illustrated embodiment includes twelve microphones 310, 348, 350, 352, 354, 356, 358, 360, 362, 364, 366, 368 positioned in different locations and/or oriented in different directions. The controller 316 may select the microphone 310 from the microphone array 308 based on a proximity of the microphone 310 to the primary human speaker (e.g., the seventh human 334) and/or a directionality of the microphone 310 relative to the primary human speaker. Thus, the controller 316 may receive data indicative of audio captured by the microphone 310, while excluding data indicative of audio captured by the unselected microphones 348, 350, 352, 354, 356, 358, 360, 362, 364, 366, 368. In this way, data indicative of audio received by the controller 316 (e.g., from the microphone 310) may emphasize sound generated by the primary human speaker (e.g., the seventh human 334), as opposed to ambient noise generated by other members of the group of humans 306 and/or other sources of sound in the venue 302.

In the illustrated embodiment, the number of microphones in the microphone array 308 is different than the number of humans in the group of humans 306. However, the number of microphones in the microphone array 308 may be the same as the number of humans in the group of humans 306. Further, in accordance with the present disclosure, each of the microphones 310, 348, 350, 352, 354, 356, 358, 360, 362, 364, 366, 368 in the microphone array 308 may be a part of a respective larger device, such as a computer, a mobile phone, or a laptop, communicatively coupled with the controller 316. For example, in an embodiment, the selected microphone 310 may be a part of a laptop corresponding to the seventh human 334 identified as the primary human speaker. Further still, the camera assembly 312 may include a number of cameras associated with the respective larger devices (e.g., computers, mobile phones, laptops) corresponding to the group of humans 306. In this way, the control assembly 304 may include devices corresponding to the group of humans 306, where each device includes a respective microphone of the microphone array 308 and camera of the camera assembly 312. Further, in certain embodiments, the conference call system 300 may be employed to broadcast the conference call to various devices (e.g., computers, laptops) over a network. Thus, the audio captured by the selected microphone 310 (or subset of microphones) may be broadcast via the network to various connected devices.

In accordance with the present disclosure, the controller 316 may be communicatively coupled with the media device 314 and configured to control the media device 314 based on the audio captured by the selected microphone 310. For example, the media device 314 may include a speaker configured to amplify the audio captured by the microphone 310 and received by the controller 316. Further, the media device 314 may correspond to a computer or laptop connected to the conference call system 300 from a location remote from the venue 302 (e.g., via a network), and the audio captured by the selected microphone 310 may be played over a speaker of the media device 314 at the remote location. Additionally or alternatively, the controller 316 may determine a command uttered by the primary human speaker based on the audio captured by the microphone 310. As previously described, a speech recognition algorithm may be employed to determine the command. In an embodiment, the command may correspond to a desired control of the media device 314. For example, the media device 314 may include a projector or television on which a presentation is presented. The controller 316 may control the media device 314 to change a slide or page of the presentation, initiate a video or other graphic associated with the presentation, or otherwise control the presentation based on the command uttered by the primary human speaker.

The above-described systems and methods may provide technical benefits over traditional systems and methods. For example, presently disclosed show attraction systems and methods may enable, relative to traditional systems and methods, improved interactions between an audience of guests (e.g., a specific guest in the audience of guests) and show elements of the show attraction. Further, presently disclosed systems and methods may enable improved audio capture of commands from one or more guests in the audience, which reduces inaccurate interactions through inaccurate show element control, reduces processing resources (e.g., complexity and cost) required for determining the commands uttered by the one or more guests in the audience (thus improving related computing operations), and improves a guest experience.

While only certain features have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
   a gimbal;
   a shotgun microphone coupled to the gimbal;
   a camera; and
   at least one processor configured to:
      receive first data indicative of an image or video feed from the camera;
      determine, based on the first data indicative of the image or video feed, a primary human speaker among a group of humans and a location of the primary human speaker;
      control the gimbal to point the shotgun microphone at the location of the primary human speaker after determining the location of the primary human speaker; and then
      receive, via the shotgun microphone, second data indicative of a sound captured by the shotgun microphone;
      determine, based on the second data indicative of the sound captured by the shotgun microphone, a command uttered by the primary human speaker; and
      execute the command by controlling a show element of the system.

2. The system of claim 1, comprising an electronic screen configured to output a digital avatar, wherein the at least one processor is configured to:

determine a characteristic of the digital avatar based on an identity of the primary human speaker, the location of the primary human speaker, or both; and control the electronic screen to output the digital avatar having the characteristic.

3. The system of claim 1, comprising the show element, wherein the show element is actuatable between a plurality of show element positions, and wherein the at least one processor is configured to:

determine a show element position of the plurality of show element positions based on an identity of the primary human speaker, the location of the primary human speaker, or both; and execute the command by controlling the show element to actuate the show element to the show element position.

4. The system of claim 1, wherein the at least one processor is configured to execute a body language detection algorithm to identify, based on the first data indicative of the image or video feed, a hand gesture indicative of the primary human speaker.

5. The system of claim 1, wherein the at least one processor is configured to execute a body language detection algorithm to identify, based on the first data indicative of the image or video feed, a facial expression indicative of the primary human speaker.

6. The system of claim 1, wherein the at least one processor is configured to execute the command by controlling a characteristic of a digital avatar displayed on an electronic screen corresponding to the show element of the system.

7. The system of claim 1, wherein the show element comprises an electronic screen, a physical show prop, a light, or any combination thereof.

8. The system of claim 1, wherein the show element comprises an electronic screen, and the at least one processor is configured to execute the command by controlling the electronic screen to change a color of a digital avatar presented on the electronic screen.

9. The system of claim 1, wherein the show element comprises a physical show prop, and the at least one processor is configured to execute the command by controlling the physical show prop to change a position of the physical show prop.

10. A system, comprising:
a microphone assembly;
a camera; and
at least one processor configured to:
receive first data indicative of an image or video feed from the camera;
determine, based on the first data indicative of the image or video feed, a primary human speaker among a group of humans and a location of the primary human speaker;
control the microphone assembly to point a microphone of the microphone assembly toward the location of the primary human speaker after determining the location of the primary human speaker; and then
receive, via the microphone, second data indicative of a sound captured by the microphone;
determine, based on the second data indicative of the sound captured by the microphone, a command uttered by the primary human speaker; and
execute the command by controlling a show element of the system.

11. The system of claim 10, wherein the microphone assembly comprises a gimbal, and the at least one processor is configured to control the microphone assembly to point the microphone toward the location of the primary human speaker by controlling the gimbal.

12. The system of claim 11, wherein the gimbal comprises a motor and the at least one processor is configured to control the microphone assembly to point the microphone toward the location of the primary human speaker by controlling the motor of the gimbal.

13. The system of claim 10, wherein the microphone assembly comprises an array of microphones, and the at least one processor is configured to:

identify, from the array of microphones, a first microphone that does not correspond to the location of the primary human speaker; and deactivate the first microphone.

14. The system of claim 13, wherein the at least one processor is configured to:

identify, from the array of microphones, a second microphone that corresponds to the location of the primary human speaker; and receive, from the second microphone, third data indicative of additional sound captured by the second microphone.

15. The system of claim 10, comprising a speaker, wherein the at least one processor is configured to control the speaker to output audio corresponding to the sound captured by the microphone.

16. The system of claim 10, comprising an electronic screen, wherein the at least one processor is configured to control a visual presentation displayed on the electronic screen based on the second data.

17. One or more tangible, non-transitory, computer readable media comprising instructions thereon that, when executed by at least one processor, cause the at least one processor to:

receive, from a camera, first data indicative of an image or video feed capturing a group of humans;

determine, via a body language detection algorithm that receives the first data indicative of the image or video feed, a primary human speaker and a location of the primary human speaker;

control a motorized gimbal to point a shotgun microphone at the location of the primary human speaker;

receive, via the shotgun microphone, second data indicative of a sound captured by the shotgun microphone;

determine, based on the second data indicative of the sound captured by the shotgun microphone, a command uttered by the primary human speaker; and control a show element based on the command.

18. The one or more tangible, non-transitory, computer readable media of claim 17, wherein the instructions, when executed by the at least one processor, cause the at least one processor to control the show element or an additional show element based on an identity of the primary human speaker, the location of the primary human speaker, or both.

19. The one or more tangible, non-transitory, computer readable media of claim 18, wherein the instructions, when executed by the at least one processor, cause the at least one processor to:

control a first characteristic of the show element based on the identity of the primary human speaker, the location of the primary human speaker, or both; and control a second characteristic of the show element based on the command such that the show element includes the first characteristic and the second characteristic simultaneously.

* * * * *